March 3, 1970  J. F. McCORMICK  3,498,329

SERVO VALVE

Filed Oct. 12, 1967

INVENTOR.
JOSEPH F. McCORMICK
BY
Wolf, Greenfield & Sacks
ATTORNEYS

United States Patent Office 3,498,329
Patented Mar. 3, 1970

3,498,329
SERVO VALVE
Joseph F. McCormick, Hingham, Mass., assignor to Delta
Hydraulics Company, Braintree, Mass., a corporation
of Massachusetts
Filed Oct. 12, 1967, Ser. No. 674,893
Int. Cl. E03b; F16k *31/06;* H04r *9/00;* H02k *33/00*
U.S. Cl. 137—625.64                           3 Claims

ABSTRACT OF THE DISCLOSURE

A servo valve having a multi-coil bobbin in the force motor, which bobbins controls the position of the flapper valve. Individual energy action of the coils achieves step changes in the position of the flapper valve which in turn achieves step changes in the main control valve and incremental mechanical displacements of the member being controlled.

---

This invention relates to servo valves and more particularly comprises a new and improved servo valve capable of producing incremental mechanical displacements.

Conventional servo valves employing electro-dynamic force motors to control the pilot are incapable of producing incremental changes in the size of the flapper valve orifice and therefore are incapable of producing incremental mechanical displacements in the output of the servo valve. Consequently the servo valves are not ordinarily able to respond to step analog inputs of the type that are generated by digital controllers.

One object of this invention is to provide a servo valve which is capable of receiving step changes in electrical inputs from a remote source and converting those inputs to incremental mechanical displacements.

Another object of this invention is to provide an electro-dynamic force motor for use with servo valves, which enables the valve to respond to step analog inputs.

Another object of this invention is to provide a servo valve that may respond to digitally coded information and will enable hydraulic output devices to be mechanically positioned by digital inputs into the servo valve.

To accomplish these and other objects, the servo valve of this invention includes among its features a control member which has a spool valve for controlling the flow of fluid through the valve. An orifice and flapper valve assembly is provided as a pilot for moving the spool valve. A force motor having a movable coil carrying the flapper valve is capable of receiving step electrical inputs from a remote source and converting these inputs to incremental mechanical displacements of the flapper valve.

Figure 1:
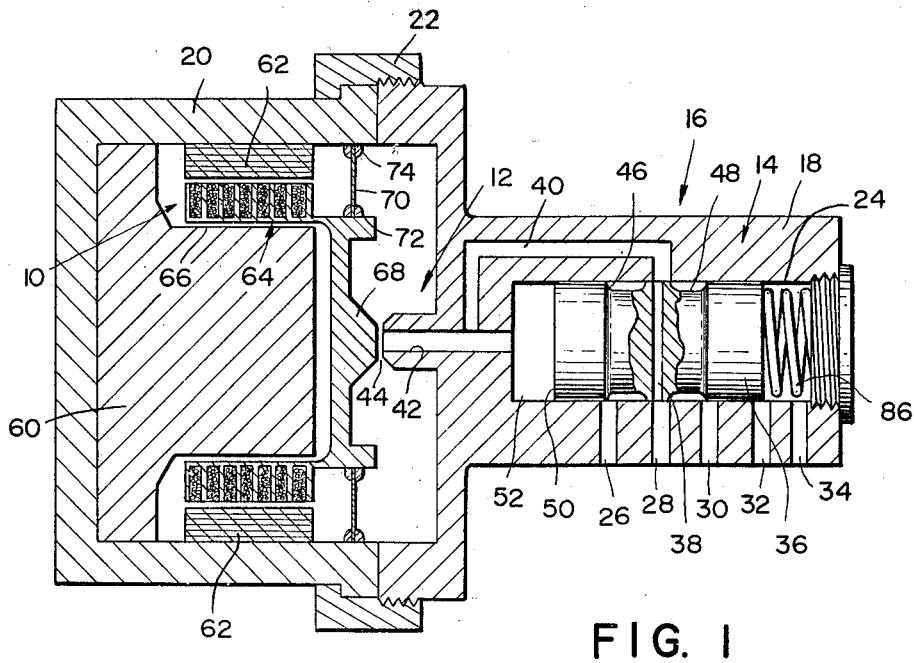
FIG. 1 is a cross sectional view of a servo valve constructed in accordance with this invention.

The servo valve shown in FIG. 1 includes in its general organization an electro-dynamic force motor 10, a pilot valve assembly 12 and a four-way control valve 14. The force motor 10, pilot valve assembly 12, and control member or valve 14 are arranged within a case 16 composed of a main section 18 and a cap 20 secured together by a knurled locking collar 22.

The four-way control valve 14 includes a control chamber 24 in the main casing section 18, and a number of passages 26, 28, 30, 32 and 34 are oriented generally radially in the section and communicate with the chamber 24. Passages 26 and 30 are control passages which lead to the particular member being controlled, such as a double acting ram (not shown); passage 28 is the supply passage; passage 32 the exhaust passage; and passage 34 may be a pressure passage to vent the chamber 24. Disposed in the chamber 24 is a spool 36 which has a radial passage 38 extending through it which at all times connects the inlet passage 28 to the passage 40 also formed in the casing 18 and which in turn communicates with the passage 42 having a discharge orifice 44 at the pilot valve assembly 12. A pair of annular recesses 46 and 48 are formed in the spool 36, which are adapted to connect the inlet passage 28 to either one of the control passages 26 and 30, respectively. Thus, when the spool 36 moves to the left as shown in FIG. 1, the annular recess 48 will overlap the edge of the inlet 28 and bring it into communication with the discharge passage 30. On the other hand, when the spool 36 has moved to the right as viewed in that figure, the annular recess 46 in the spool will place the inlet 28 in communication with the control passage 26.

The spool 36 is displaced in the chamber 24 by fluid pressure applied against its left end 50 by means of the subchamber 52 formed on its left. The subchamber 52 is in direct communication with the passage 42, and the pressure therefore in the chamber 52 which controls the position of the spool is in turn a function of the pressure at the inlet passage 28 and the orifice 44 of the pilot valve assembly 12.

The force motor 10 is disposed in the cap 20 and includes an inner pole piece 60 and an outer pole piece 62, each fixed with respect to one another in the cap. A multi-coil bobbin assembly 64 is disposed in the gap 66 between the inner and outer pole pieces 60 and 62, and the bobbin assembly 64 carries a flapper valve 68 which controls the size of the orifice 44 at the pilot. As the multi-coil assembly 64 moves in the gap 66 toward and away from the orifice 44, the flapper valve 68 moves toward and away from the orifice with it and varies the orifice size. In the embodiment shown, the bobbin assembly 46 includes a disc spring 70 having an inner ring 72 secured to the bobbin and an outer ring 74 secured to the casing. The details of the spring 70 form no part of the present invention, but in accordance with this invention, the spring has a known constant spring rate and biases the bobbin assembly 64 to a neutral position.

Figure 2:
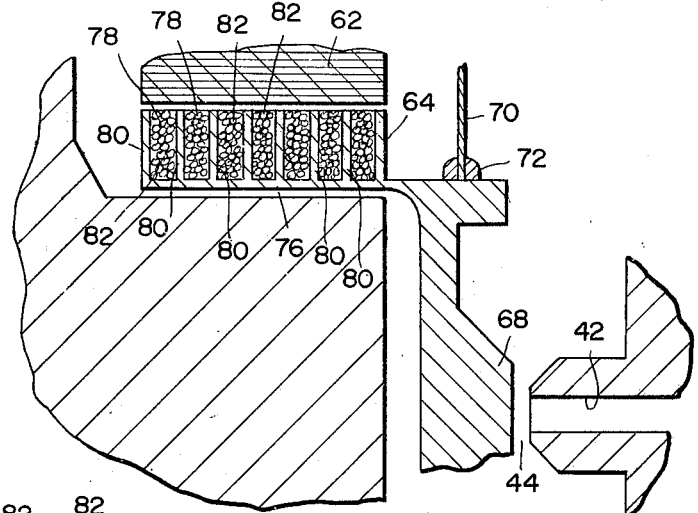
FIG. 2 is an enlarged cross sectional detail of a portion of the servo valve shown in FIG. 2.
Figure 3:
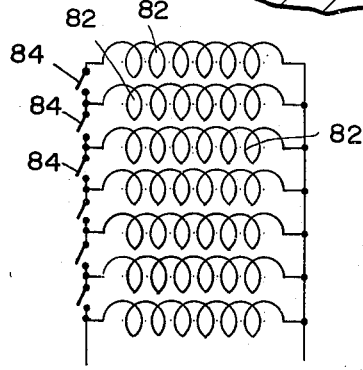
FIG. 3 is a schematic diagram of the coil.

Referring now to FIG. 2, the bobbin assembly 64 includes a thimble-shaped bobbin 76 at the closed end of which is the flapper valve 68. The bobbin 76 is sub-divided into a plurality of individual compartments 78 by radial fins 80, and each of the compartments 78 carries its own coil 82. As suggested in FIG. 3, each of the coils 82 is connected in parallel and is separately energized by a switch 84. Each of the switches 84 may be separately closed, and the action of the field created by the inner and outer magnets 60 and 62 on the coil assembly produces a mechanical force which is a function of the total coil current. A rotary switch or some other well known device may be employed to close one or more of the switches 84 to increase the current in the field and thereby increase the force on the bobbin assembly to displace the flapper valve 68.

The direction of flow of the current through the coils 82 will of course determine the direction of displacement of the coil assembly and thus will control the direction or the incremental step increases and decreases in the size of the orifice 44.

In operation, the double acting ram or other device controlled by the control valve 14 may be moved step by step in either direction by increasing or decreasing the number of coils 82 which are energized. As the size of the orifice 44 is reduced step by step by displacement of the coil assembly, the spool 36 will displace step by step as a result of the change in pressure exerted in the subchamber 52. The spring 86 disposed to the right of the spool 36 in the chamber 24 of course serves to counteract the pressure exerted against the spool from the other end and stablizes it under a constant pressure at the subchamber. Under normal applications, the pressure of the fluid applied through the inlet passage 28 is constant, and therefore a direct functional relationship exists between the pressure drop at the orifice 44 and the pressure applied against the spool in the subchamber 52.

What is claimed is:
1. A servo valve comprising
    a casing having an inlet and outlet,
    a control member in said casing including a spool valve which moves back and forth in the casing and controls the flow of fluid through said casing between said inlet and outlet by its movement,
    a chamber on one side of said spool within the casing for applying pressure to the spool to change the condition of the valve,
    an orifice in the casing connected to the chamber and a flapper valve mounted in the casing and controlling the flow through said orifice for varying the pressure in the chamber to move the spool valve,
    and a force motor having a plurality of movable coils joined together and carrying the flapper valve and means for separately energizing each coil for displacing the flapper valve incrementally over said orifice and thereby incrementally vary the flow rate through the control member.

2. A servo valve as described in claim 1 further characterized by a spring supporting said coils in a neutral position and enabling movement of the coils with the flapper valve toward or away from the orifice.

3. A servo valve as described in claim 1 further characterized by
    said coils being connected electrically in parallel relationship,
    and means electrically connected to the coils for energizing one or more of the coils to incrementally change the position of the flapper valve.

References Cited
UNITED STATES PATENTS

| | | | |
|---|---|---|---|
| 2,625,136 | 1/1953 | Moog | 137—625.61 |
| 2,781,461 | 2/1957 | Booth et al. | |
| 2,926,221 | 2/1960 | Kagris | 179—115.5 |
| 3,099,280 | 7/1963 | Holzbock | 137—83 |
| 3,126,026 | 3/1964 | Moore | 137—84 |
| 3,389,355 | 6/1968 | Schroeder | 251—137 XR |

HENRY T. KLINKSIEK, Primary Examiner

U.S. Cl. X.R.

179—115.5; 251—137; 310—15, 16